(12) United States Patent
Nagarajan et al.

(10) Patent No.: US 11,224,069 B2
(45) Date of Patent: Jan. 11, 2022

(54) RELIABLE LOW LATENCY WIRELESS TRANSFER OF VIRTUAL REALITY HEADSET SENSOR INFORMATION

(71) Applicant: QUALCOMM Incorporated, San Diego, CA (US)

(72) Inventors: Balaji Nagarajan, Nagavarapalya (IN); Pavan Bindumadhav Parvatikar, Bangalore (IN); Chiranthan Purushotham, Bangalore (IN); Sachin Mankal, Bangalore (IN); Atul Joshi, Pune (IN)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 16/720,925

(22) Filed: Dec. 19, 2019

(65) Prior Publication Data

US 2021/0195640 A1 Jun. 24, 2021

(51) Int. Cl.
| | |
|---|---|
| *H04W 74/08* | (2009.01) |
| *H04W 52/02* | (2009.01) |
| *H04W 72/04* | (2009.01) |
| *H04W 72/12* | (2009.01) |
| *H04W 74/04* | (2009.01) |

(52) U.S. Cl.
CPC ... *H04W 74/0816* (2013.01); *H04W 52/0216* (2013.01); *H04W 72/0446* (2013.01); *H04W 72/1242* (2013.01); *H04W 74/04* (2013.01); *H04W 74/0875* (2013.01)

(58) Field of Classification Search
None
See application file for complete search history.

(56) References Cited

U.S. PATENT DOCUMENTS

| | | | |
|---|---|---|---|
| 7,688,783 B1 * | 3/2010 | Benveniste | H04W 72/0406 370/329 |
| 8,552,857 B2 * | 10/2013 | Berezowski | G08B 25/009 340/539.22 |
| 10,460,700 B1 | 10/2019 | Mendhekar et al. | |
| 2011/0216658 A1 * | 9/2011 | Etkin | H04L 43/00 370/242 |
| 2012/0243485 A1 * | 9/2012 | Merlin | H04W 28/20 370/329 |
| 2013/0272198 A1 * | 10/2013 | Azizi | H04W 72/02 370/328 |
| 2013/0279427 A1 | 10/2013 | Wentink et al. | |
| 2018/0075820 A1 * | 3/2018 | Hicks | G09G 5/363 |

FOREIGN PATENT DOCUMENTS

| | | |
|---|---|---|
| EP | 3486753 A1 | 5/2019 |
| WO | 2017062960 A1 | 4/2017 |

OTHER PUBLICATIONS

International Search Report and Written Opinion—PCT/US2020/065753—ISA/EPO—dated Mar. 24, 2021.

* cited by examiner

*Primary Examiner* — Alex Skripnikov

(74) *Attorney, Agent, or Firm* — Patterson & Sheridan, LLP

(57) ABSTRACT

Certain aspects of the present disclosure generally relate to wireless communications and, more particularly, to wireless transfer of sensor information between a station (e.g., a VR headset) and an access point (e.g., a server).

26 Claims, 8 Drawing Sheets

RELIABLE LOW LATENCY WIRELESS TRANSFER OF VIRTUAL REALITY HEADSET SENSOR INFORMATION

FIELD OF THE DISCLOSURE

Certain aspects of the present disclosure generally relate to wireless communications and, more particularly, to wireless transfer of sensor information between a station, such as a virtual reality (VR) headset and an access point (e.g., a VR server).

DESCRIPTION OF RELATED ART

Wireless communication networks are widely deployed to provide various communication services such as voice (or other type audio), video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

Certain applications, such as virtual reality (VR), augmented reality (AR), and wireless video transmission may demand data rates, for example, in the range of several Gigabits per second. Certain wireless communications standards, such as the Institute of Electrical and Electronics Engineers (IEEE) 802.11 standard, denotes a set of Wireless Local Area Network (WLAN) air interface standards developed by the IEEE 802.11 committee for short-range communications (e.g., tens of meters to a few hundred meters).

Amendments 802.11ad, 802.11 ay, and 802.11az to the WLAN standard define the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure provide a method for wireless communications by an access point. The method generally includes streaming media to a first station over a wireless medium, obtaining sensor frames having sensor data therein from the first station, changing content of the media streamed to the first station based on the sensor data, and taking one or more actions to give the sensor frames higher priority relative to other traffic on the wireless medium.

Aspects of the present disclosure provide a method for wireless communications by a first station. The method generally includes obtaining media streamed from an access point over a wireless medium and outputting sensor data for transmission to the access point, wherein content of the media streamed to the first station changes based on the sensor data and the sensor data is sent with higher priority relative to other traffic on the wireless medium.

Aspects of the present disclosure provide an apparatus for wireless communications. The apparatus generally includes a processing system configured to stream media to a first station over a wireless medium and an interface configured to obtain sensor frames having sensor data therein from the first station. In addition, the processing system is further configured to change content of the media streamed to the first station based on the sensor data and take one or more actions to give the sensor frames higher priority relative to other traffic on the wireless medium.

Aspects of the present disclosure provide an apparatus for wireless communications. The apparatus generally includes an interface configured to obtain media streamed from an access point over a wireless medium and a processing system configured to output sensor data for transmission to the access point. In addition, content of the media streamed to the first station changes based on the sensor data and the sensor data is sent with higher priority relative to other traffic on the wireless medium.

Aspects of the present disclosure provide an apparatus for wireless communications. The apparatus generally includes means for streaming media to a first station over a wireless medium, means for obtaining sensor frames having sensor data therein from the first station, means for changing content of the media streamed to the first station based on the sensor data and means for taking one or more actions to give the sensor frames higher priority relative to other traffic on the wireless medium.

Aspects of the present disclosure provide an apparatus for wireless communications. The apparatus generally includes means for obtaining media streamed from an access point over a wireless medium and means for outputting sensor data for transmission to the access point. In addition, content of the media streamed to the first station changes based on the sensor data and the sensor data is sent with higher priority relative to other traffic on the wireless medium.

Aspects of the present disclosure provide a computer-readable medium for wireless communications. The computer-readable medium generally includes codes executable to stream media to a first station over a wireless medium, obtain sensor frames having sensor data therein from the first station, change content of the media streamed to the first station based on the sensor data, and take one or more actions to give the sensor frames higher priority relative to other traffic on the wireless medium.

Aspects of the present disclosure provide a computer-readable medium for wireless communications. The computer-readable medium generally includes codes executable to obtain media streamed from an access point over a wireless medium and output sensor data for transmission to the access point. In addition, content of the media streamed to the first station changes based on the sensor data and the sensor data is sent with higher priority relative to other traffic on the wireless medium.

Aspects of the present disclosure provide an access point. The access point generally includes a processing system configured to stream media to a first station over a wireless medium and a receiver configured to receive sensor frames having sensor data therein from the first station. In addition, the processing system is further configured to change content of the media streamed to the first station based on the sensor data and take one or more actions to give the sensor frames higher priority relative to other traffic on the wireless medium.

Aspects of the present disclosure provide a first station. The first station generally includes a receiver configured to receive media streamed from an access point over a wireless medium and a processing system configured to output sensor data for transmission to the access point. In addition, content of the media streamed to the first station changes based on the sensor data and the sensor data is sent with higher priority relative to other traffic on the wireless medium.

Aspects of the present disclosure also provide apparatuses, means, and computer readable medium capable of and/or having instruction stored thereon for performing the operations described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
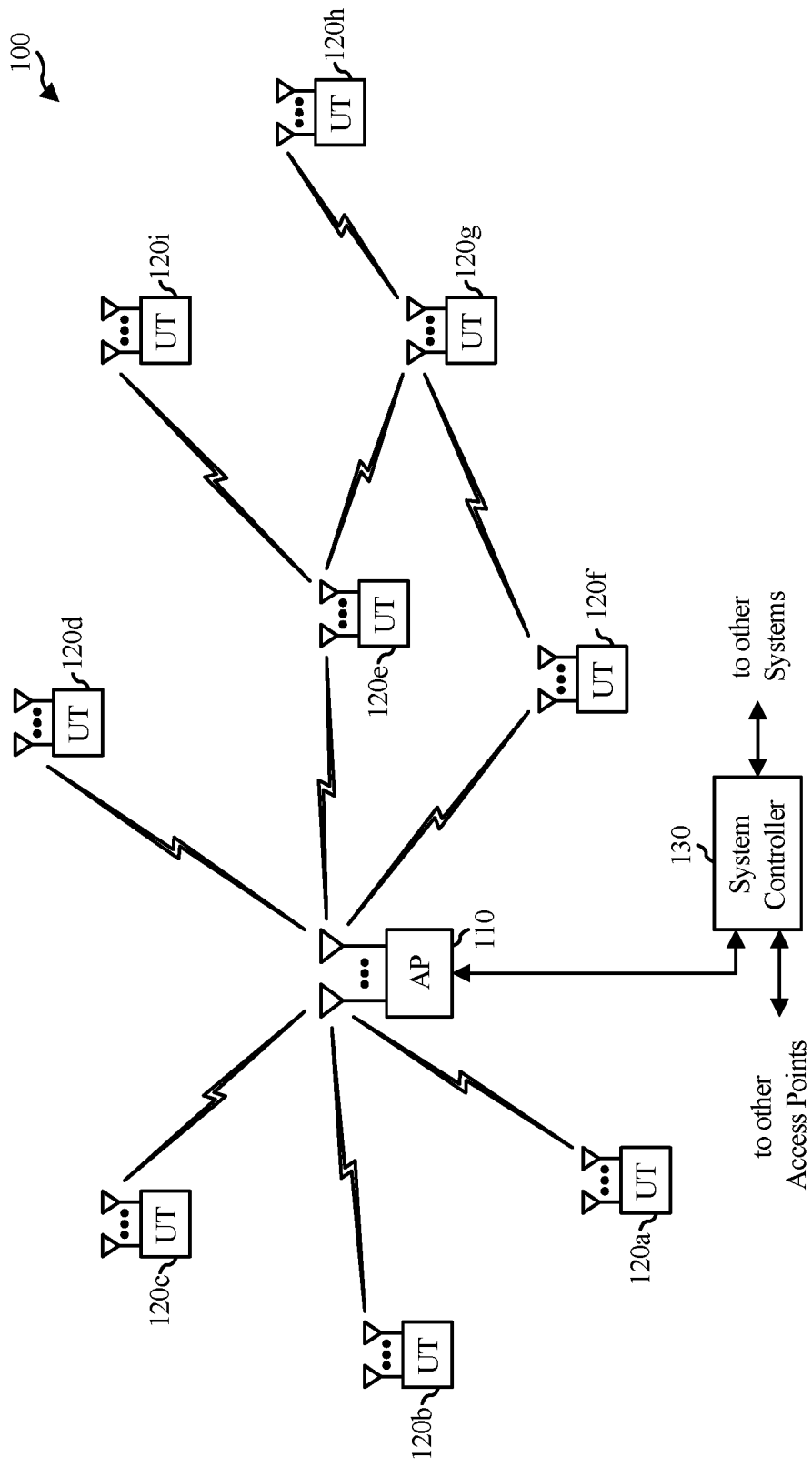
FIG. 1 illustrates a diagram of an example wireless communications network, in accordance with certain aspects of the present disclosure.

Certain aspects of the present disclosure provide techniques to efficiently transfer sensor information between a station, such as a virtual reality (VR) headset and an access point (e.g., a VR server). In some cases, video content displayed in a VR headset may be generated by the VR server and dependent on the headset orientation. Giving priority to sensor data that indicates the orientation may help ensure the sensor data is delivered to the server timely and the video content is updated accordingly.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to wireless communications and, more particularly, numerology and frames for neighbor aware networks (NAN) in the sub-1 GHz (S1G) band. As will be described in more detail herein, different types of discovery windows (DWs) of different durations and at different intervals may be defined. A NAN device (e.g., access point (AP) or non-AP station in the NAN) may wake up during one or more types of discovery windows to transmit time synchronization information and/or service discovery information.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA" such as an "AP STA" acting as an AP or a "non-AP STA") or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communications System

FIG. 1 illustrates a system 100 in which aspects of the disclosure may be performed. For example, a VR server may be implemented as an access point 110 configured to perform operations 500 of FIG. 5, to stream media to a VR headset implemented as a user terminal 120 configured to perform operations 600 of FIG. 6.

The system 100 may be, for example, a multiple-access multiple-input multiple-output (MIMO) system 100 with access points 110 and user terminals 120. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer or future user terminals being implemented with technology such as SDMA, OFDM or OFDMA to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
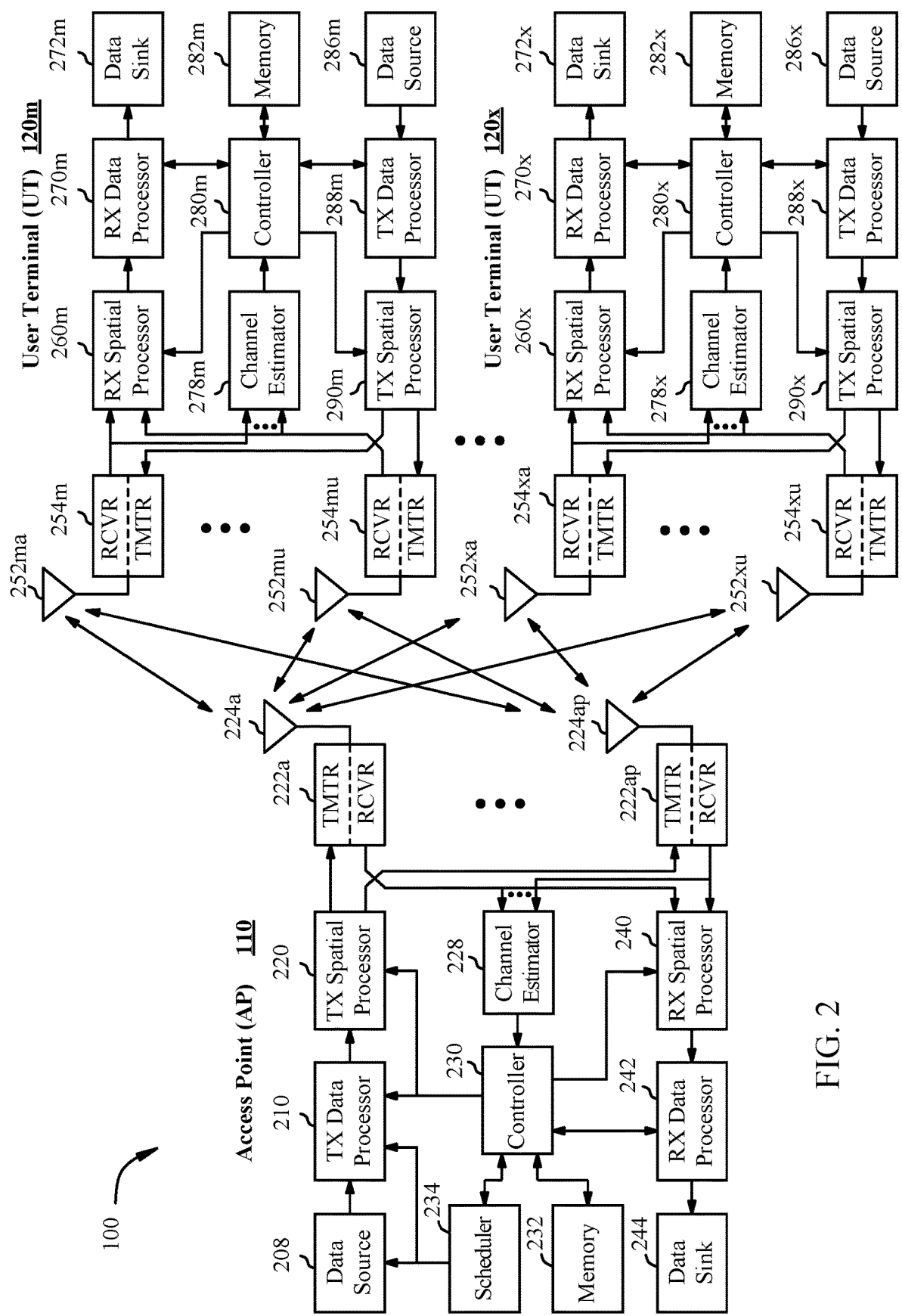
FIG. 2 illustrates a block diagram of an example access point and user terminals, in accordance with certain aspects of the present disclosure.

FIG. 2 illustrates example components of the AP 110 and two UTs 120*m* and 120*x*, which are examples of the UTs 120 operating in the MIMO system 100 illustrated in FIG. 1. One or more components of the AP 110 and UT 120 may be used to practice aspects of the present disclosure. For example, antenna 224, Tx/Rx 222, processors 210, 220, 240, 242, and/or controller 230 of AP 110 may be used to perform operations 500 of FIG. 5. Similarly, antenna 252, Tx/Rx 254, processors 260, 270, 288, and 290, and/or controller 280 of UT 120 may be used to perform operations 600 of FIG. 6.

The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and Nan may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for Nan user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
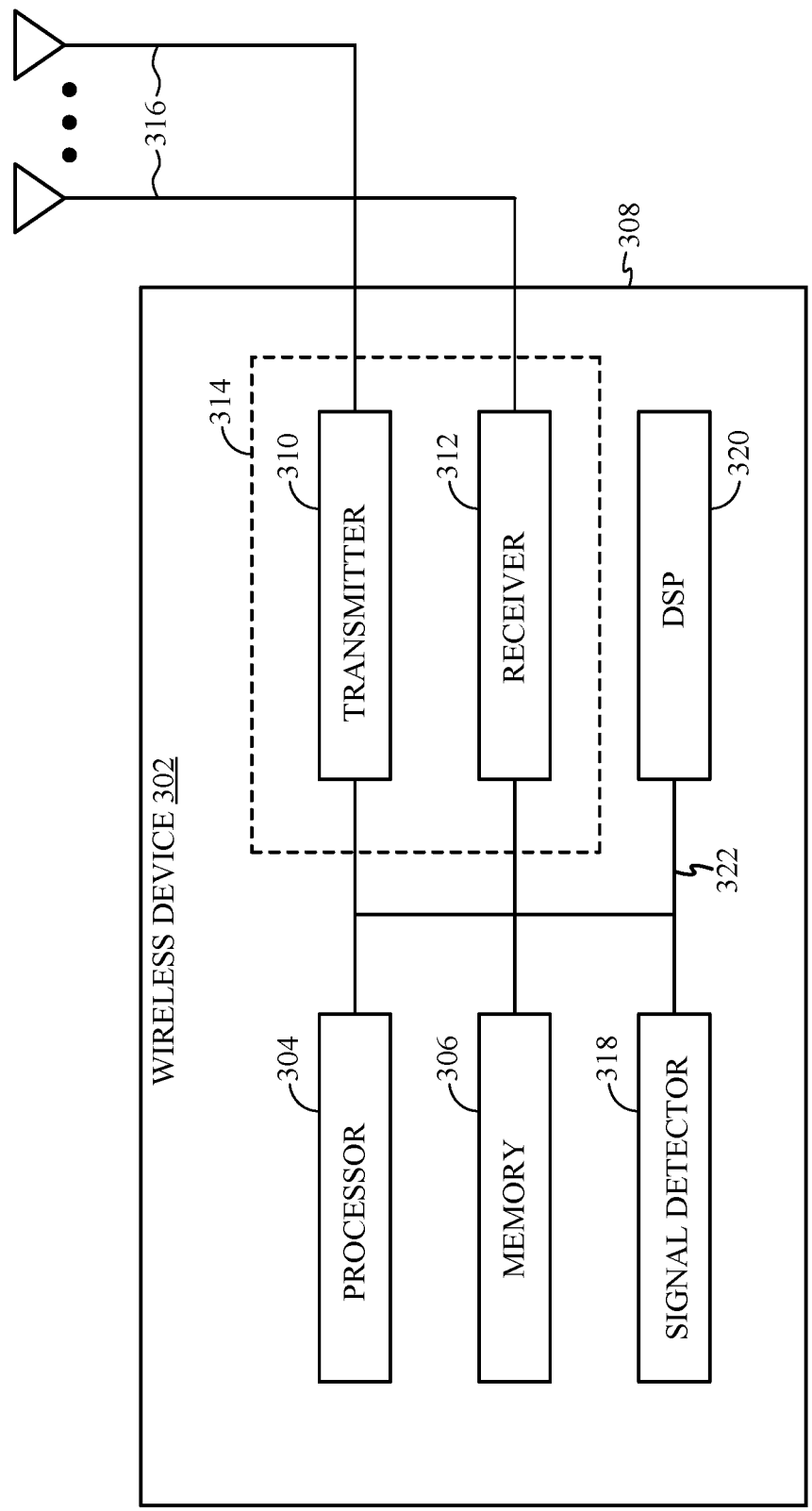
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 900 and 1000 illustrated in FIGS. 9 and 10. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Wireless Transfer of VR Sensor Information

Certain aspects of the present disclosure generally relate to wireless communications and, more particularly, to wireless transfer of sensor information between a station (e.g., a VR headset) and an access point (e.g., a VR server). The techniques may help meet various requirements for a VR product, such as low latency transfer of the sensor information so video content can be adapted accordingly.

Figure 4:
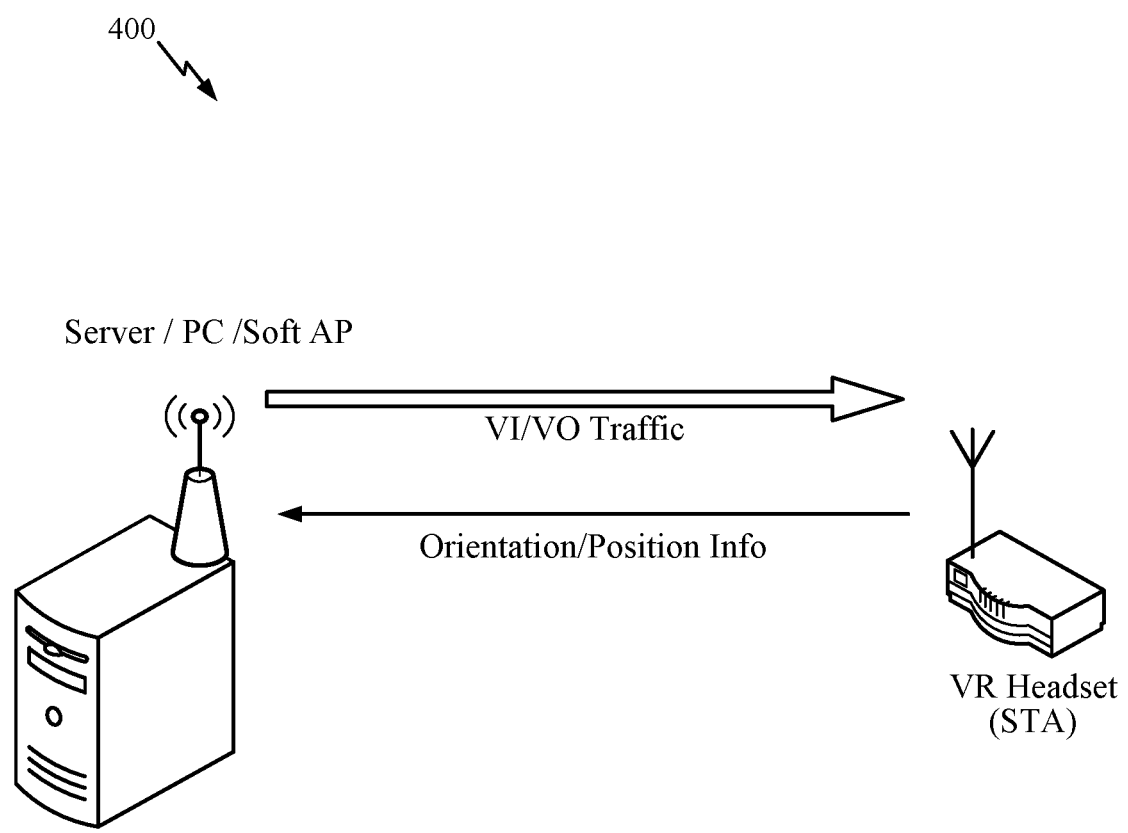
FIG. 4 illustrates an example virtual reality (VR) scenario, in which aspects of the present disclosure may be practiced.

For example, FIG. 4 illustrates an example VR scenario, in which aspects of the present disclosure may be practiced.

In the illustrated example, video content is streamed from a VR Server (e.g., an AP or PC acting as an AP) to a VR headset. In such applications, the media (video and/or audio) content is typically expected to change based on orientation and/or position of the VR headset to make the user experience seem real.

The media content is streamed through an AP to STA WiFi connection in the downlink direction. In some cases, a WiFi chipset may be used to connect to the server. In some cases, the server may operate in what is referred to as a Soft AP mode (an abbreviation of software enabled access point). A soft AP generally refers to software enabling hardware (e.g., a PC or chipset) that is not specifically designed for such purpose to act as a wireless access point. In some cases, another WiFi chipset may be used to connect to a display subsystem of the VR headset (and this WiFi chipset may operate in a non-AP STA mode).

To update the VR server of the headset orientation and position, a frame with sensor information (a sensor frame) may be forwarded periodically from the VR headset to the VR Server in the uplink direction (e.g., every 2 ms). Based on this sensor information, media content may be rendered accordingly at the VR Server and sent to the STA (WiFi chipset) to be displayed (played) in the display (and headphones) of the VR headset.

Aspects of the present disclosure address various considerations, from the WLAN perspective, to support this type of rapidly changing media content, based on the VR sensor information.

For example, the sensor frame (content) may be considered critical low latency information which should get higher priority over other type(s) of traffic in the medium. According to aspects presented herein, an AP may take action to ensure that its own downlink traffic does not delay (or interfere with) the uplink sensor frame. In some cases, when possible, the AP may protect the medium such that the sensor frame gets predictable and preferential access over the medium, while still being able to provide good quality of service (QoS) for the downlink voice (audio) and video traffic.

Figure 5:
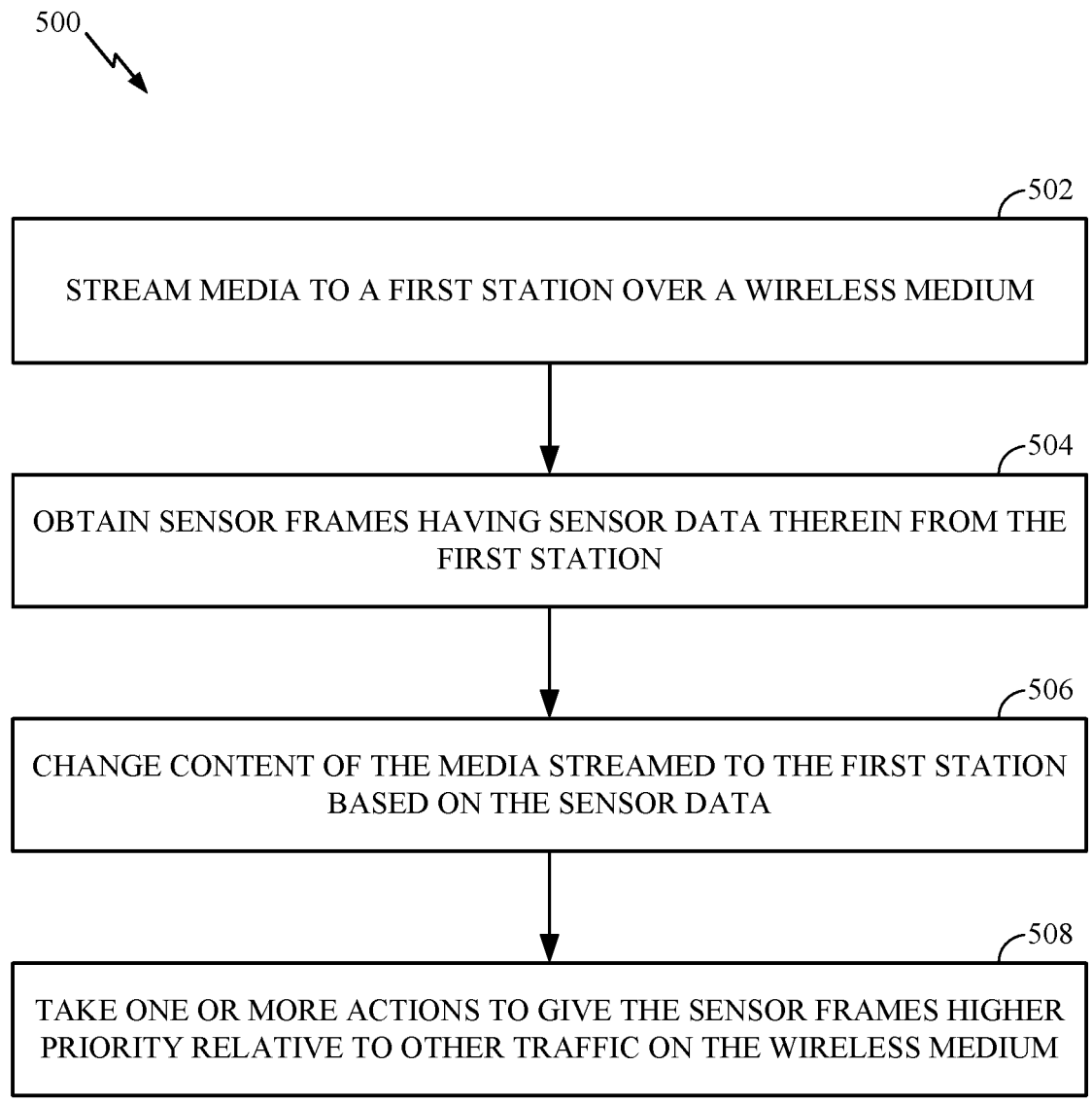
FIG. 5 illustrates example operations for wireless communications by an access point, in accordance with certain aspects of the present disclosure.

FIG. 5 illustrates example operations 500 for wireless communications by an apparatus, in accordance with certain aspects of the present disclosure. For example, operations 500 may be performed by an AP 110 of FIG. 1 (e.g., acting as a VR server to a VR headset).

Operations 500 begin, at 502, by streaming media to a first station over a wireless medium. For example, the first station may be the VR headset shown in FIG. 4 (receiving streaming media from the VR server).

At 504, the AP obtains sensor frames having sensor data therein from the first station. For example, the sensor data may include position and/or orientation of the VR headset and the sensor frames may be any suitable type frame format.

At 506, the AP changes content of the media streamed to the first station based on the sensor data. For example, the VR server may change the rendered contents of a scene based on the position and/or orientation of the VR headset.

At 508, the AP takes one or more actions to give the sensor frames higher priority relative to other traffic on the wireless medium. Examples of such actions are described below with reference to FIGS. 7 and 8.

Figure 6:
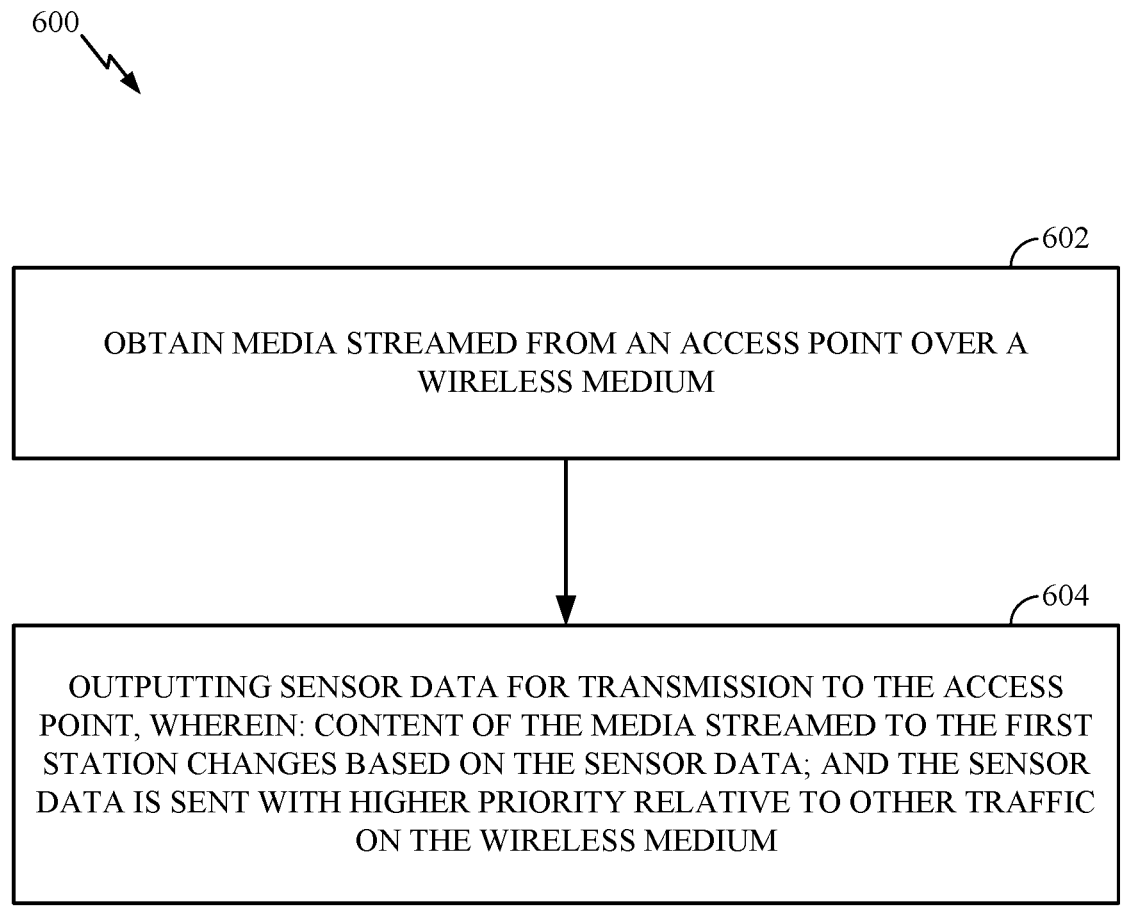
FIG. 6 illustrates example operations for wireless communications by a first station (e.g., a VR headset), in accordance with certain aspects of the present disclosure.

FIG. 6 illustrates example operations for wireless communications by an apparatus, in accordance with certain aspects of the present disclosure. For example, operations 600 may be performed by a STA 120 of FIG. 1 (e.g., incorporated in or embodied as a VR headset) to process media content streamed from a server performing operations 500.

Operations 600 begin, at 602, by obtaining media streamed from an access point over a wireless medium. At 604, the STA outputs sensor data for transmission to the access point, wherein: content of the media streamed to the first station changes based on the sensor data; and the sensor data is sent with higher priority relative to other traffic on the wireless medium.

As sensor updates are sent at periodic intervals (e.g., 2 ms), both the AP and STA (VR server and VR headset) may detect this periodic event (e.g., triggered by a timer) and perform the following operations. The event may be referred to as a sensor frame transmission time (or SFTT).

The AP may halt downlink transmissions, upon detecting an SFTT event, allowing the STA the opportunity to transmit this sensor information. The STA may acquire channel access, upon detecting the SFTT event, and transmit the sensor frame (including headset position/orientation information).

In some cases, this SFTT event may be synchronized between the AP and STA (e.g., performing this synchronization may be considered one of the actions the AP takes to give sensor frames higher priority relative to other frames). In some cases, both the AP and STA may implement synchronized timers. The timers may be realized using a time synchronization function (TSF). TSF refers to a mechanism provided in WLAN standards to synchronize timing among stations in a same basic service set (BSS). Each station maintains a local TSF timer and timing synchronization is achieved by stations periodically exchanging timing information through beacon frames.

Using a mechanism such as TSF, the synchronized timers at the VR server and station can generate an SFTT event at a programmable periodicity. Thus, both the AP and STA can co-ordinate using SFTT events to trigger transmission (and reception) of the sensor frame.

Various schemes may be used for coordination between a VR server (AP) and a VR headset (STA) are described herein. For example, according to a first solution, sensor frame transmissions by a STA may be scheduled (e.g., via an SFTT event/trigger). According to a second solution, the sensor frame transmissions are based on polling from AP (e.g., based on a poll sent at an SFTT event/trigger).

Figure 7:
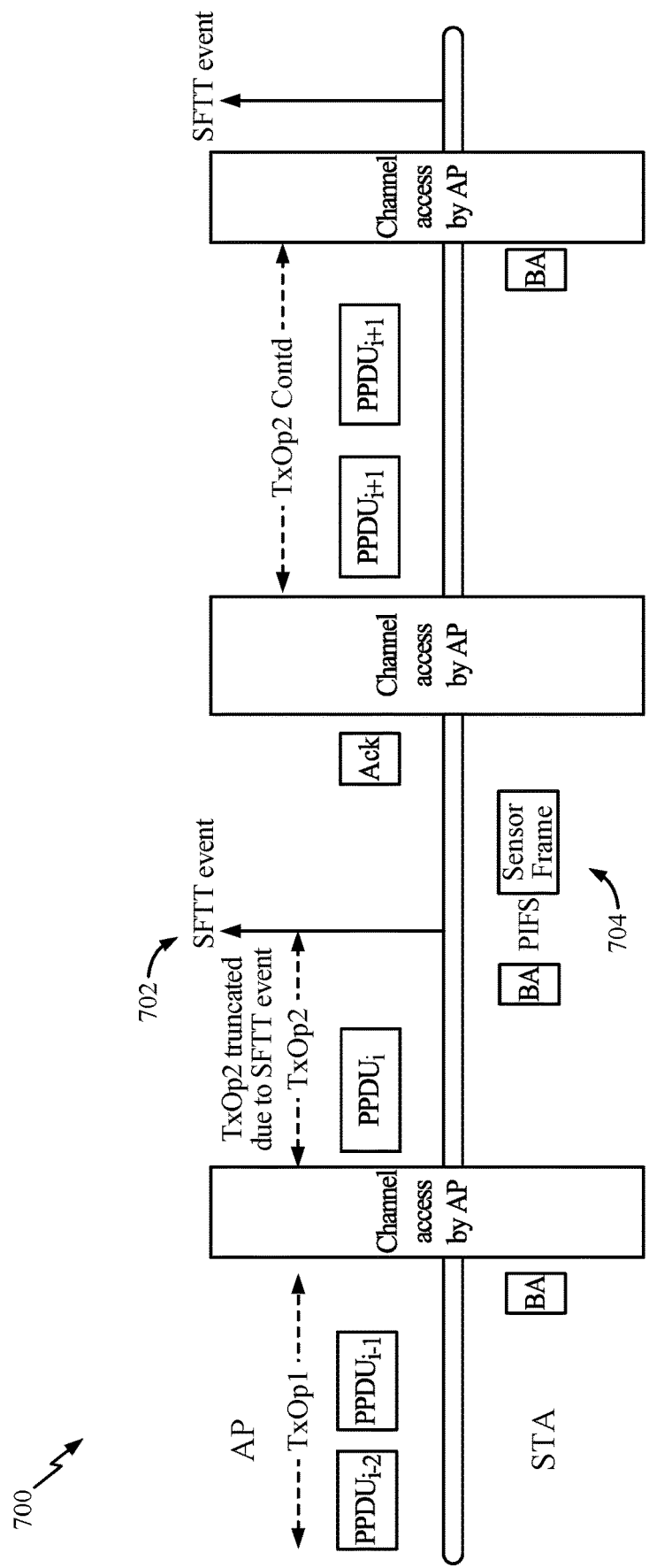
FIG. 7 illustrates a first example timing diagram for the transfer of VR sensor information, in accordance with certain aspects of the present disclosure.
Figure 8:
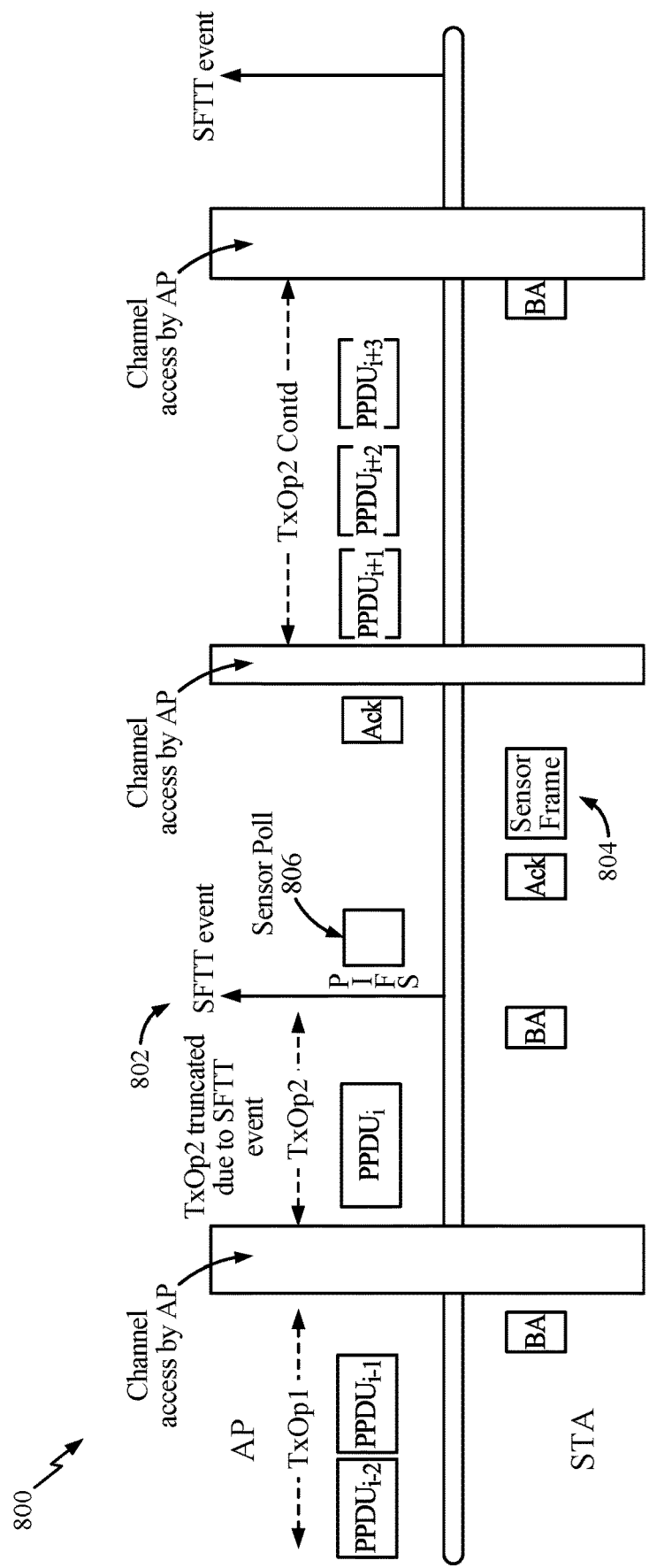
FIG. 8 illustrates a second example timing diagram for the transfer of VR sensor information, in accordance with certain aspects of the present disclosure.

FIGS. 7 and 8 illustrate example timing diagrams for the transfer of VR sensor information, in accordance with the first and second solution, respectively.

Referring first to FIG. 7, an SFTT timer may be used as reference for position update event. As noted above, the SFTT event may be synchronous to a TSF timer (as synchronized between the AP and STA). For example, an SFTT event 702 may occur in conjunction with a target beacon transmission time (TBTT) and, hence, this event may be synchronized in both the AP and STA. The SFTT event 702 may be configured so it does not align with a TBTT event (in order to avoid collision with beacon transmission). For example, in some cases, the SFTT can be at a programmable (or fixed) offset from TBTT (e.g., SFTT can be realized using a TBTT type timer).

Operations at the AP may be described as follows. Media content traffic, such as voice and/or video (Vo/Vi) traffic carried in Physical Layer Convergence Protocol (PLCP) protocol data unit (PPDU) transmissions during transmission opportunities (TxOPs) for which the AP has gained access to the medium. As illustrated, the PPDUs may be queued at the AP such that a TxOP (labeled TxOP 2) is truncated at a boundary of the SFTT event 702. Truncation of the TxOP (meaning the AP halts transmission) allows the STA to access the medium and send the sensor frame 704.

As illustrated, the AP may perform channel access after a programmable time after the SFTT event, to regain the medium and resume (the truncated) TxOP. In some cases, the AP may perform channel access with only a Distributed Coordination Function (DCF) Interframe Space DIFS period without backoff. This is possible as the STA may access the channel with only a Point coordination function (PCF) Interframe Space (PIFS) it will have higher priority over the AP. As an option, the AP could transmit a frame before the SFTT event 702 to set a network allocation vector (NAV) to prevent all STAs (but the STA sending the sensor frame 704) from accessing the medium.

Operations at the STA for the first option shown in FIG. 7 may be described as follows. The sensor frame 704 may be queued in a separate ring (e.g., a separate queue for traffic with separate transmission/QoS parameters). As such, the STA may be configured to transmit the sensor frame 704 a PIFS boundary after the SFTT event 702. Since AP traffic is truncated at the SFTT event, the STA may be able to acquire channel access almost immediately (e.g., at PIFS boundary) and transmit the sensor frame 704 to the AP. Allowing the STA lower channel access time (PIFS-to gain access to the channel faster than other devices) effectively gives the sensor frames higher priority relative to other frames (sent by other STAs) on the wireless medium. As noted above, the targeted STA sending the sensor frame (which may be one of many served by the AP) can ignore the NAV set by AP at the SFTT event (and/or reset its own NAV).

Referring to FIG. 8, in the second (polled) solution, the SFTT timer may again be used to generate an position update event (e.g., SFTT event 804), in a similar manner as the first solution.

As with the first solution, the media traffic PPDUs may be queued such that a TxOP (TxOP 2) is truncated at the boundary of the SFTT event 802. According to the second solution, however, the AP may queue a Sensor Poll frame 806 in a separate ring, scheduled to be transmitted at a PIFS duration after SFTT. In response to the Sensor Poll frame 806, the STA may send a Sensor Frame 804. Again, TXoPs for media traffic PPDUs may be resumed after the sensor poll frame exchange.

Operations at the STA for the second option may be described as follows. Again, the sensor frame 804 may be queued in a ring, configured to be transmitted in response to Sensor Poll frame 806. The sensor frame 804 may be transmitted at SIFS following the Sensor Poll frame 804. In some cases, hardware may be configured to allow the use of certain types of trigger frames (e.g., 802.11AX format trigger frames) as sensor poll frames.

By giving higher priority to sensor frames carrying position and/or orientation of a VR headset, the techniques presented herein may allow media content to be rapidly adapted and enhance user experience for VR applications.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for receiving, means for obtaining, and means for communicating may be a receiver (e.g., the receiver unit of transceiver 254) and/or an antenna(s) 252 of the user terminal 120 illustrated in FIG. 2, the receiver (e.g., the receiver unit of transceiver 222) and/or antenna(s) 224 of access point 110 illustrated in FIG. 2, or the receiver 312, antennas 316, and/or the bus system 322 illustrated in FIG. 3. Means for transmitting and means for outputting may be a transmitter (e.g., the transmitter unit of transceiver 254) and/or an antenna(s) 252 of the user terminal 120 illustrated in FIG. 2, the transmitter (e.g., the transmitter unit of transceiver 222) and/or antenna(s) 224 of access point 110 illustrated in FIG. 2, or the transmitter 310, antennas 316, and/or the bus system 322 illustrated in FIG. 3.

Means for streaming, means for changing, means for taking one or more actions, means for synchronizing, means for resuming, means for performing, means for configuring, means for maintaining and means for ignoring may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above. For example, an algorithm for determining a data communication window (DCW) timeline for communicating data between a group of devices including the apparatus, and algorithm for maintaining a local clock for the DCW timeline, and an algorithm for updating the local clock based on at least one of a relative drift between the local clock and the clock associated with the first network cluster, or a move of the apparatus from the first network cluster to a second network cluster, may be implemented by processing systems configured to perform the above functions.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining occurrence of a first type of discovery window for a network that occurs according to a first interval, instructions for determining occurrence of a second type of discovery window for the that occurs according to a second interval shorter than the first interval, instructions for obtaining, from at least one other apparatus associated with the network, at least one of time synchronization information or service information during at least one of the first type of discovery window or the second type of discovery window, and instructions for outputting, for transmission in the network, at least one of the time synchronization information or the service information during at least one of the first type of discovery window or the second type of discovery window.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to stream media to a first station over a wireless medium; and
    an interface configured to obtain sensor frames having sensor data therein from the first station, wherein the processing system is further configured to:
    change content of the media streamed to the first station based on the sensor data; and
    take one or more actions to give the sensor frames higher priority relative to other traffic on the wireless medium, wherein:
        the sensor frames are obtained from the first station periodically in accordance with a scheduled sensor frame transmission time (SFTT); and
        the one or more actions comprise truncating a transmit opportunity (TxOP) for frames containing media content that overlaps with the SFTT.

2. The apparatus of claim 1, wherein the higher priority comprises lower channel access time relative to other frames on the wireless medium.

3. The apparatus of claim 1, wherein the media content comprises at least one of video or audio.

4. The apparatus of claim 1, wherein the sensor data comprises at least one of position or orientation of the first station.

5. The apparatus of claim 1, wherein the processing system is further configured to synchronize the scheduled SFTT with the first station via a time synchronization function (TSF).

6. The apparatus of claim 1, wherein the one or more actions further comprise outputting a frame for transmission to set a network allocation vector (NAV) with a duration to cover transmission of a sensor frame by the first station.

7. The apparatus of claim 1, wherein the processing system is further configured to resume outputting frames containing media content for transmission to the first station after truncating the TxOP and after receiving a sensor frame.

8. The apparatus of claim 7, wherein the processing system is further configured to:
    perform channel access of the wireless medium a programmable time after the SFTT, before resuming outputting the frames containing media content.

9. The apparatus of claim 8, wherein the channel access is performed based on at least one of a Point coordination function (PCF) Interframe Spacing (PIFS) or a backoff timer.

10. The apparatus of claim 1, wherein:
    the processing system is further configured to stream media to at least a second station over the wireless medium; and
    the interface is further configured to obtain sensor frames having sensor data therein from the second station, wherein the sensor frames are obtained periodically from the first and second stations in accordance with first and second SFTTs.

11. The apparatus of claim 10, wherein the processing system is further configured to configure the first and second stations so the first and second SFTTs are offset in time.

12. The apparatus of claim 1, wherein:
    the processing system is further configured to periodically output polling frames for transmission to the first station in accordance with the SFTT;

the sensor data is obtained via the sensor frames after transmission of one or more of the polling frames.

13. The apparatus of claim 12, wherein the one or more actions further comprise sending a frame to set a network allocation vector (NAV) with a duration to cover transmission of a sensor frame by the first station.

14. The apparatus of claim 12, wherein the processing system is further configured to resume streaming media content after truncating the TxOP and after receiving a sensor frame.

15. The apparatus of claim 14, wherein the processing system is further configured to:
perform channel access of the wireless medium a programmable time after the SFTT, before resuming streaming media content.

16. The apparatus of claim 15, wherein the channel access is performed based on at least one of a point coordination function interframe spacing (PIFS), distributed coordination function interframe spacing (DIFS) or a backoff timer.

17. The apparatus of claim 12, wherein:
the processing system is further configured to stream media to at least a second station over the wireless medium; and
the interface is further configured to obtain sensor frames having sensor data therein from the second station, wherein the sensor frames are obtained periodically from the first and second stations in response to the polling frames being periodically outputted for transmission in accordance with first and second SFTTs.

18. An apparatus for wireless communications by a first station, comprising:
an interface configured to obtain media streamed from an access point over a wireless medium; and
a processing system configured to periodically output sensor data for transmission to the access point via sensor frames in accordance with a scheduled sensor frame transmission time (SFTT), wherein:
content of the media streamed to the first station changes based on the sensor data;
the sensor data is output for transmission with higher priority relative to other traffic on the wireless medium; and
the sensor data is output for transmission based on a truncated transmit opportunity (TxOP) for frames containing media content that overlaps with the SFTT.

19. The apparatus of claim 18, wherein the sensor data comprises at least one of position or orientation of the first station.

20. The apparatus of claim 18, wherein the processing system is further configured to synchronize the scheduled SFTT with the access point via a time synchronization function (TSF).

21. The apparatus of claim 18, wherein the processing system is further configured to maintain a timer that triggers an SFTT event after which the first station sends a sensor frame.

22. The apparatus of claim 21, wherein:
the processing system is further configures to perform channel access of the wireless medium after the truncated TxOP; and
the channel access is performed based on at least one of a point coordination function interframe spacing (PIFS), distributed coordination function interframe spacing (DIFS) or a backoff timer.

23. The apparatus of claim 18, wherein the processing system is further configured to:
ignore a frame sent by the access point to set a network allocation vector (NAV) with a duration to cover transmission of a sensor frame by the first station.

24. The apparatus of claim 18, wherein:
the interface is further configured to periodically obtain polling frames from the access point in accordance with the SFTT; and
the sensor data is output for transmission via sensor frames in response to the polling frames.

25. An access point, comprising:
a processing system configured to stream media to a first station over a wireless medium; and
a receiver configured to receive sensor frames having sensor data therein from the first station, wherein the processing system is further configured to:
change content of the media streamed to the first station based on the sensor data; and
take one or more actions to give the sensor frames higher priority relative to other traffic on the wireless medium, wherein:
the sensor frames are obtained from the first station periodically in accordance with a scheduled sensor frame transmission time (SFTT); and
the one or more actions comprise truncating a transmit opportunity (TxOP) for frames containing media content that overlaps with the SFTT.

26. A first station, comprising:
a receiver configured to receive media streamed from an access point over a wireless medium; and
a processing system configured to periodically output sensor data for transmission to the access point via sensor frames in accordance with a scheduled sensor frame transmission time (SFTT), wherein:
content of the media streamed to the first station changes based on the sensor data;
the sensor data is output for transmission with higher priority relative to other traffic on the wireless medium; and
the sensor data is output for transmission based on a truncated transmit opportunity (TxOP) for frames containing media content that overlaps with the SFTT.

* * * * *